United States Patent
Hsien et al.

(10) Patent No.: US 11,558,591 B2
(45) Date of Patent: Jan. 17, 2023

(54) PROJECTOR FOCUSING METHOD AND PROJECTOR FOCUSING SYSTEM CAPABLE OF PROJECTING HIGH RESOLUTION IMAGES AT ARBITRARY POSITIONS

(71) Applicant: WELTREND SEMICONDUCTOR INC., Hsinchu (TW)

(72) Inventors: Ta Hsien, Hsinchu (TW); Ming-Hung Kao, Hsinchu (TW); Meng-Che Tsai, Hsinchu (TW)

(73) Assignee: WELTREND SEMICONDUCTOR INC., Hsinchu (TW)

(*) Notice: Subject to any disclaimer, the term of this patent is extended or adjusted under 35 U.S.C. 154(b) by 0 days.

(21) Appl. No.: 17/469,861

(22) Filed: Sep. 8, 2021

(65) Prior Publication Data

US 2022/0239871 A1    Jul. 28, 2022

(30) Foreign Application Priority Data

Jan. 22, 2021  (TW) ................................. 110102502

(51) Int. Cl.
| | | |
|---|---|---|
| *H04N 9/31* | (2006.01) | |
| *G03B 21/53* | (2006.01) | |
| *G02B 26/08* | (2006.01) | |

(52) U.S. Cl.
CPC ............. *H04N 9/317* (2013.01); *G03B 21/53* (2013.01); *G02B 26/0833* (2013.01)

(58) Field of Classification Search
CPC ...... H04N 9/315; H04N 9/317; H04N 9/3132; H04N 9/3141; H04N 9/3155; H04N 9/3185; G03B 21/008; G03B 21/28; G03B 21/53; G03B 21/145; G03B 21/147; G03B 21/208; G03B 21/2053; G03B 21/2066; G02B 26/0816; G02B 26/0825; G02B 26/0833
See application file for complete search history.

(56) References Cited

U.S. PATENT DOCUMENTS

| | | | | |
|---|---|---|---|---|
| 9,532,016 B2* | 12/2016 | Hajjar | ................. | H04N 9/3135 |
| 9,581,883 B2* | 2/2017 | Smits | ................... | H04N 9/3164 |
| 10,939,091 B1* | 3/2021 | Choi | .................... | G01S 7/4814 |

FOREIGN PATENT DOCUMENTS

| | | |
|---|---|---|
| CN | 1823523 A | 8/2006 |
| CN | 110798671 A | 2/2020 |

(Continued)

*Primary Examiner* — Sultan Chowdhury
(74) *Attorney, Agent, or Firm* — Winston Hsu

(57) ABSTRACT

A projector focusing method includes acquiring a plane angle of a light beam and acquiring a first distance and a second distance between two sides of a light beam edge displayed on a projection plane and a time of flight device after the time of flight device emits the light beam to the projection plane, acquiring a plane equation of the projection plane according to the first distance and the second distance, acquiring an optical axis vector of a digital micromirror device (DMD) disposed inside the projector, designating target coordinates of the DMD, converting the target coordinates to the projection target coordinates on the projection plane according to the plane equation, acquiring an customized emitting vector according to the projection target coordinates and a lens position of the projector, and acquiring an ideal focal distances of the projector according to the customized emitting vector and the optical axis vector.

20 Claims, 5 Drawing Sheets

(56) References Cited

FOREIGN PATENT DOCUMENTS

| | | |
|---|---|---|
| CN | 111948889 A | 11/2020 |
| JP | 5320693 | 10/2013 |
| TW | I421535 B | 1/2014 |

\* cited by examiner

PROJECTOR FOCUSING METHOD AND PROJECTOR FOCUSING SYSTEM CAPABLE OF PROJECTING HIGH RESOLUTION IMAGES AT ARBITRARY POSITIONS

BACKGROUND OF THE INVENTION

1. Field of the Invention

The present invention illustrates a projector focusing method and a projector focusing system, and more particularly, a projector focusing method and a projector focusing system capable of projecting high resolution images at arbitrary positions.

2. Description of the Prior Art

In recent years, with the rapid development of technologies, the requirements of display devices are gradually increased. Although various display devices are introduced to the market, only projectors can provide a display function of projecting images with high resolution and large size. The projector can use its internal tiny reflecting mirrors as a core display element, such as a digital micro-mirror device (DMD). Further, the projector can project the image generated by the DMD to a screen with hundreds of inches. The projector can provide enough brightness and resolution of the projected image on the screen for sharing image information with viewers. In other words, when the projector projects the image to the screen, the size and resolution of the displayed image are not limited to the size of the display panel.

A focusing method of general cameras can be categorized into a passive auto image focusing method and an active auto image focusing method. The passive auto image focusing method belongs to visual focusing technology. The passive auto image focusing method includes phase detection focusing method and contrast detection focusing method. The passive auto image focusing method can determine an optimal focal distance based on image frames. Therefore, the passive auto image focusing method belongs to a focusing method having high accuracy. The active auto image focusing method can use an emitter to emit an infrared signal, an ultrasonic signal, or a laser signal to an object. Then, a receiver can be introduced to receive a reflected signal. Therefore, the active auto image focusing method can determine an appropriate focal distance. Therefore, the active auto image focusing method belongs to a high-speed and interference-free focusing method. However, in the passive auto image focusing method, the focusing speed is slow. Further, displayed frames are jittered or repeatedly pulled back and forth during a focusing process. The active auto image focusing method only supports a short-range focal length and a single-point focusing operation.

Therefore, to improve the focusing method for applying to a projection process of the projector is an important issue.

SUMMARY OF THE INVENTION

In an embodiment of the present invention, a projector focusing method is disclosed. The projector focusing method comprises providing a time of flight (ToF) device and a projection plane, acquiring a first distance between a first side of a light beam image displayed on a projection plane and the ToF device, acquiring a second distance between a second side of the light beam image displayed on the projection plane and the ToF device, and acquiring a first angle formed between a first line from the first side of the light beam image to the ToF device and a second line from the second side of the light beam image to the ToF device after the ToF device emits a light beam onto the projection plane, acquiring a plane equation of the projection plane according to the first distance, the second distance, and the first angle, acquiring a plurality of image positioning coordinates of a digital micro-mirror device (DMD) disposed inside of a projector, acquiring an optical axis vector of the DMD according to the plurality of image positioning coordinates, designating target coordinates of the DMD and converting the target coordinates to the projection target coordinates on the projection plane according to the plane equation, acquiring a customized focus position emitting vector according to the projection target coordinates and a lens position of the projector, acquiring an ideal focal distance of the projector according to the customized focus position emitting vector and the optical axis vector, and configuring the projector according to the ideal focal distance so that a projected image is clearly displayed on the projection plane at the projection target coordinates.

In another embodiment of the present invention, a projector focusing system is disclosed. The projector focusing system comprises a projector, a time of flight device, and a projection plane. The projector comprises a digital micro-mirror device (DMD), a lens, a gravity sensor, and a processor. The DMD is configured to generate an image. The lens faces the DMD and is configured to project the image. The gravity sensor is configured to detect an offset angle of the projector. The projection plane is configured to generate a projected image. After the ToF device emits a light beam onto the projection plane, the processor acquires a first distance between a first side of a light beam image displayed on the projection plane and the ToF device. The processor acquires a second distance between a second side of the light beam image displayed on the projection plane and the ToF device. The processor acquires a first angle formed between a first line from the first side of the light beam image to the ToF device and a second line from the second side of the light beam image to the ToF device. The processor acquires a plane equation of the projection plane according to the first distance, the second distance, and the first angle. The processor acquires a plurality of image positioning coordinates of the DMD. The processor acquires an optical axis vector of the DMD according to the plurality of image positioning coordinates. The processor designates target coordinates of the DMD and converts the target coordinates to the projection target coordinates on the projection plane according to the plane equation. The processor acquires a customized focus position emitting vector according to the projection target coordinates and a lens position of the projector. The processor acquires an ideal focal distance of the projector according to the customized focus position emitting vector and the optical axis vector. The processor configures the projector according to the ideal focal distance so that the projected image is clearly displayed on the projection plane at the projection target coordinates.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
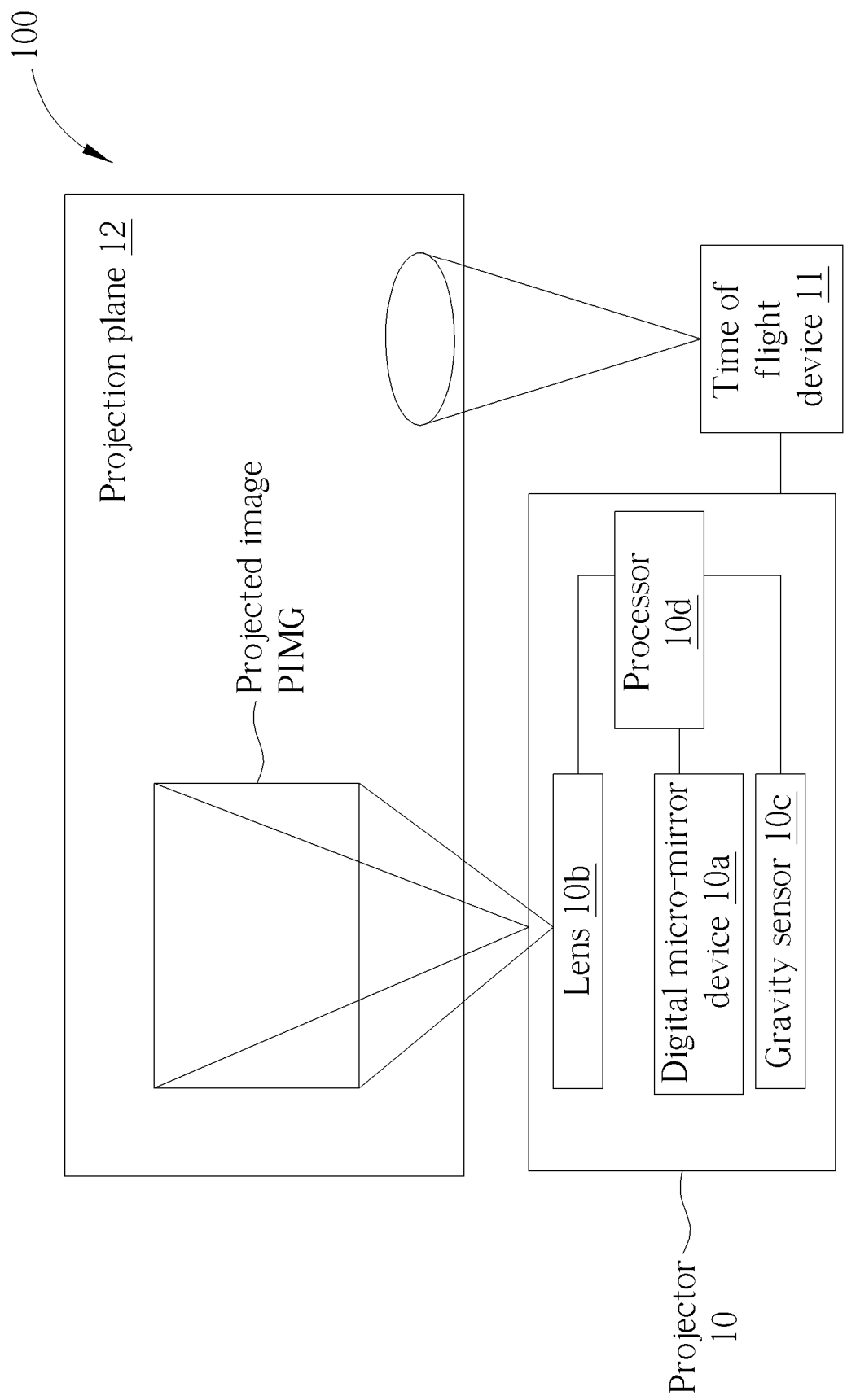
FIG. 1 is a block diagram of a projector focusing system according to an embodiment of the present invention.

FIG. 1 is a block diagram of a projector focusing system 100 according to an embodiment of the present invention. The projector focusing system 100 includes a projector 10, a time of flight (ToF) device 11, and a projection plane 12. The projector 10 can be any type of projector, such as a digital light processing (DLP) projector. The projector 10 may include a digital micro-mirror device (DMD) 10a, a lens 10b, a gravity sensor 10c, and a processor 10d. The digital micro-mirror device 10a is used for generating images. The lens 10b faces the digital micro-mirror device 10a for projecting images. A gravity sensor (G-Sensor) 10c is used for sensing at least one offset angle of the projector 10. For example, the gravity sensor 10c can sense three offset angles of the projector 10 on a pitch axis, a yaw axis, and a roll axis. The processor 10d is coupled to the digital micro-mirror device 10a, the lens 10b, and the gravity sensor 10c for controlling the digital micro-mirror device 10a, the lens 10b, and the gravity sensor 10c and receiving sensing data. The ToF device 11 is coupled to the projector 10. The ToF device 11 can use a light-emitting diode or a laser diode for emitting infrared light or laser. After the infrared light or laser is emitted to a plane of an object, the object can generate reflected light. Therefore, the ToF device 11 can calculate a distance between different object positions according to time differences between the emitted infrared light or the laser and the received reflected light. The projection plane 12 is used to generate a projected image PIMG. The projection plane 12 can be a wall, a screen, or a projection curtain. Further, the projector 10 can use a focus ring to set an ideal focal distance. After the processor 10d sets the projector 10 to the ideal focal distance, the projector 10 can clearly display images. In the projector focusing system 100, after the ToF device 11 emits a light beam onto the projection plane 12, the processor 10d acquires a first distance between a first side of a light beam image displayed on the projection plane 12 and the ToF device 11. The processor 10d acquires a second distance between a second side of the light beam image displayed on the projection plane 12 and the ToF device 11. The processor 10d acquires a first angle formed between a first line from the first side of the light beam image to the ToF device 11 and a second line from the second side of the light beam image to the ToF device 11. The processor 10d acquires a plane equation of the projection plane 12 according to the first distance, the second distance, and the first angle. The processor 10d acquires a plurality of image positioning coordinates of the DMD 10a. The processor 10d acquires an optical axis vector of the DMD 10a according to the plurality of image positioning coordinates. The processor 10d designates target coordinates of the DMD 10a and converts the target coordinates to the projection target coordinates on the projection plane 12 according to the plane equation. The processor 10d acquires a customized focus position emitting vector according to the projection target coordinates and a lens position of the projector 10. The processor 10d acquires an ideal focal distance of the projector 10 according to the customized focus position emitting vector and the optical axis vector. The processor 10d configures the projector 10 according to the ideal focal distance so that the projected image PIMG is clearly displayed on the projection plane 12 at the projection target coordinates. In other words, when a user wants to control a certain region of the projected image PIMG being clearly displayed, the projector focusing system 100 can quickly and automatically adjust the ideal focal distance to satisfy the requirements of the user. Details of acquiring the ideal focal distance by the projector focusing system 100 are illustrated later.

Figure 2:
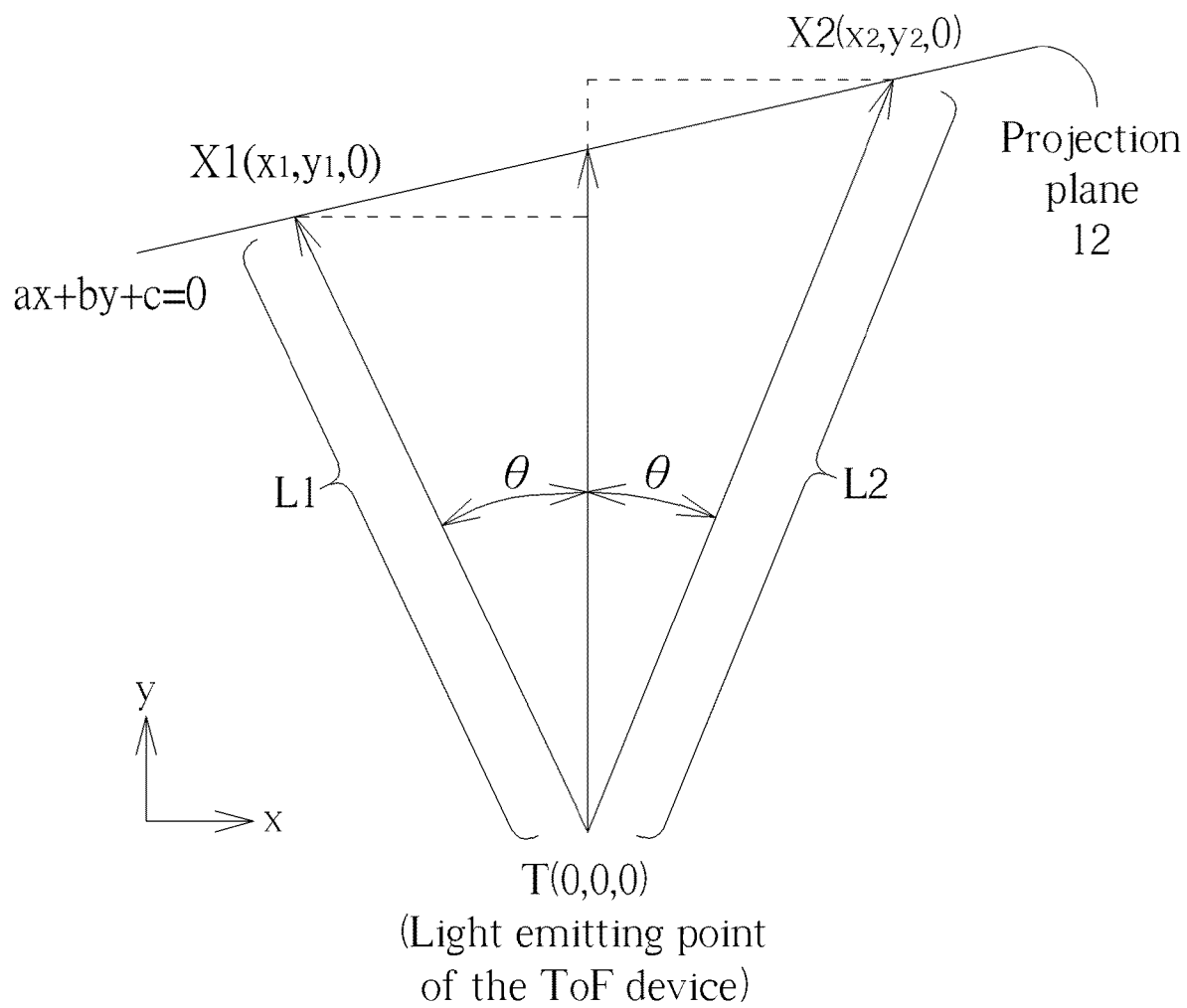
FIG. 2 is an illustration of acquiring a projection plane by using a time of flight device of the projector focusing system in FIG. 1.

FIG. 2 is an illustration of acquiring the projection plane 12 by using the ToF device 11 of the projector focusing system 100. As previously mentioned, a light emitting point T of the ToF device 11 can emit the infrared light or laser light to the projection plane 12 for generating the reflected light. Therefore, the ToF device 11 can calculate the distance based on the time difference between the emitted infrared light or the laser and the received reflected light. As shown in FIG. 2, after the ToF device 11 emits infrared light or laser at the light emitting point T, a first distance between a first side of a light beam image displayed on the projection plane 12 and the light emitting point T of the ToF device 11 is denoted as L1. L1 is a deterministic distance. Similarly, a second distance between a second side of a light beam image displayed on the projection plane 12 and the light emitting point T of the ToF device 11 is denoted as L2. L2 is a deterministic distance. A first angle $2\Theta$ formed between a first line from the first side of the light beam image to the ToF device 11 and a second line from the second side of the light beam image to the ToF device 11 can be detected. A projection point of the light beam displayed on the projection plane 12 on the left side is denoted as X1. A projection point of the light beam displayed on the projection plane 12 on the right side is denoted as X2. For simplicity, a perspective three-dimensional coordinates system is introduced along z-axis (Z=0). Coordinates of the light emitting point T of the ToF device 11 are denoted as T(0,0,0). Coordinates of the projection point X1 are denoted as X1 $(x_1, y_1, 0)$. Coordinates of the projection point X2 are denoted as X2 $(x_2, y_2, 0)$. It is assumed that the projection plane 12 satisfies the plane equation ax+by+c=0. According to the Pythagorean Theorem and trigonometric functions, the following equation can be derived. The coordinates X1 $(x_1, y_1, 0)$ of the projection point X1 satisfy the equations:

$$\begin{cases} y = \cot(\theta)x \\ L1^2 = x^2 + y^2 \end{cases} \quad (1)$$

Based on (1), solutions of coordinates X1 $(x_1, y_1, 0)$ of the projection point X1 can be derived. Similarly, the coordinates X2 $(x_2, y_2, 0)$ of the projection point X2 satisfy the equations:

$$\begin{cases} y = -\cot(\theta)x \\ L2^2 = x^2 + y^2 \end{cases} \quad (2)$$

Based on (2), solutions of coordinates X2 ($x_2,y_2,0$) of the projection point X2 can be derived. In other words, the processor 10$d$ can acquire a plurality of plane coordinates of the projection plane 12 according to the first distance L1, the second distance L2, and the first angle 2Θ, such as the coordinates X1 ($x_1,y_1,0$) of the projection point X1 and the coordinates X2 ($x_2,y_2,0$) of the projection point X2. Then, processor 10$d$ can acquire at least two direction vectors according to the plurality of plane coordinates. For example, a direction vector from X1 to X2 can be denoted as $V_{X1X2}=(x_2-x_1, y_2-y_1, 0)$. Then, the processor 10$d$ can acquire the plane equation of the projection plane 12 according to the at least two direction vectors, denoted as $ax+by+c=0$. Here, a, b, and c are the normal vector coefficients of the projection plane 12, which can be derived from a vector cross product operation according to at least two direction vectors.

Since the projector focusing system 100 introduces the gravity sensor 10$c$, coefficients of the projection plane 12 can be calibrated for improving detection accuracy, as illustrated below. The gravity sensor 10$c$ can be used for acquiring offset angles of the projector 10 on a pitch axis, a yaw axis, and a roll axis. For example, an offset angle of the projector 10 on the pitch axis is denoted as $\Theta_y$. An offset angle of the projector 10 on the yaw axis is denoted as $\Theta_z$. An offset angle of the projector 10 on the roll axis is denoted as $\Theta_x$. Therefore, the processor 10$d$ can generate a rotation vector matrix R according to the offset angles on the pitch axis, the yaw axis, and the roll axis. The rotation vector matrix R can be written as:

$$R=R_y(\Theta_y)R_x(\Theta_x)R_z(\Theta_z) \quad (3)$$

In equation (3), $R_y(\Theta_y)$, $R_x(\Theta_x)$, and $R_z(\Theta_z)$ are square matrices and relevant to the offset angles. $R_y(\Theta_y)$, $R_x(\Theta_x)$, and $R_z(\Theta_z)$ can be illustrated as:

$$R_z(\Theta_z) = \begin{bmatrix} \cos(\theta_z) & -\sin(\theta_z) & 0 \\ \sin(\theta_z) & \cos(\theta_z) & 0 \\ 0 & 0 & 1 \end{bmatrix} \quad (4)$$

$$R_x(\Theta_x) = \begin{bmatrix} 1 & 0 & 0 \\ 0 & \cos(\theta_x) & -\sin(\theta_x) \\ 0 & \sin(\theta_x) & \cos(\theta_x) \end{bmatrix} \quad (5)$$

$$R_y(\Theta_y) = \begin{bmatrix} \cos(\theta_y) & 0 & -\sin(\theta_y) \\ 0 & 1 & 0 \\ -\sin(\theta_y) & 0 & \cos(\theta_y) \end{bmatrix} \quad (6)$$

Further, in another embodiment, the coordinates X1($x_1, y_1, 0$) of the projection point X1 and the coordinates X2($x_2, y_2, 0$) of the projection point X2 can be adjusted (or say, calibrated) according to the rotation vector matrix R, as illustrated below.

$$R \begin{bmatrix} x_1 \\ y_1 \\ 0 \end{bmatrix} \rightarrow \begin{bmatrix} x_1 \\ y_1 \\ 0 \end{bmatrix} \quad (7)$$

$$R \begin{bmatrix} x_2 \\ y_2 \\ 0 \end{bmatrix} \rightarrow \begin{bmatrix} x_2 \\ y_2 \\ 0 \end{bmatrix} \quad (8)$$

In other words, after the gravity sensor 10$c$ is introduced to the projector focusing system 100, the rotation vector matrix R can be generated according to the offset angles detected by the gravity sensor 10$c$ for calibrating the plane equation. Further, if the projector 10 has no offset angle on the pitch axis, the yaw axis, and the roll axis (i.e., $\Theta_x=\Theta_y=\Theta_z=0$), the rotation vector matrix is an identity matrix.

Figure 3:
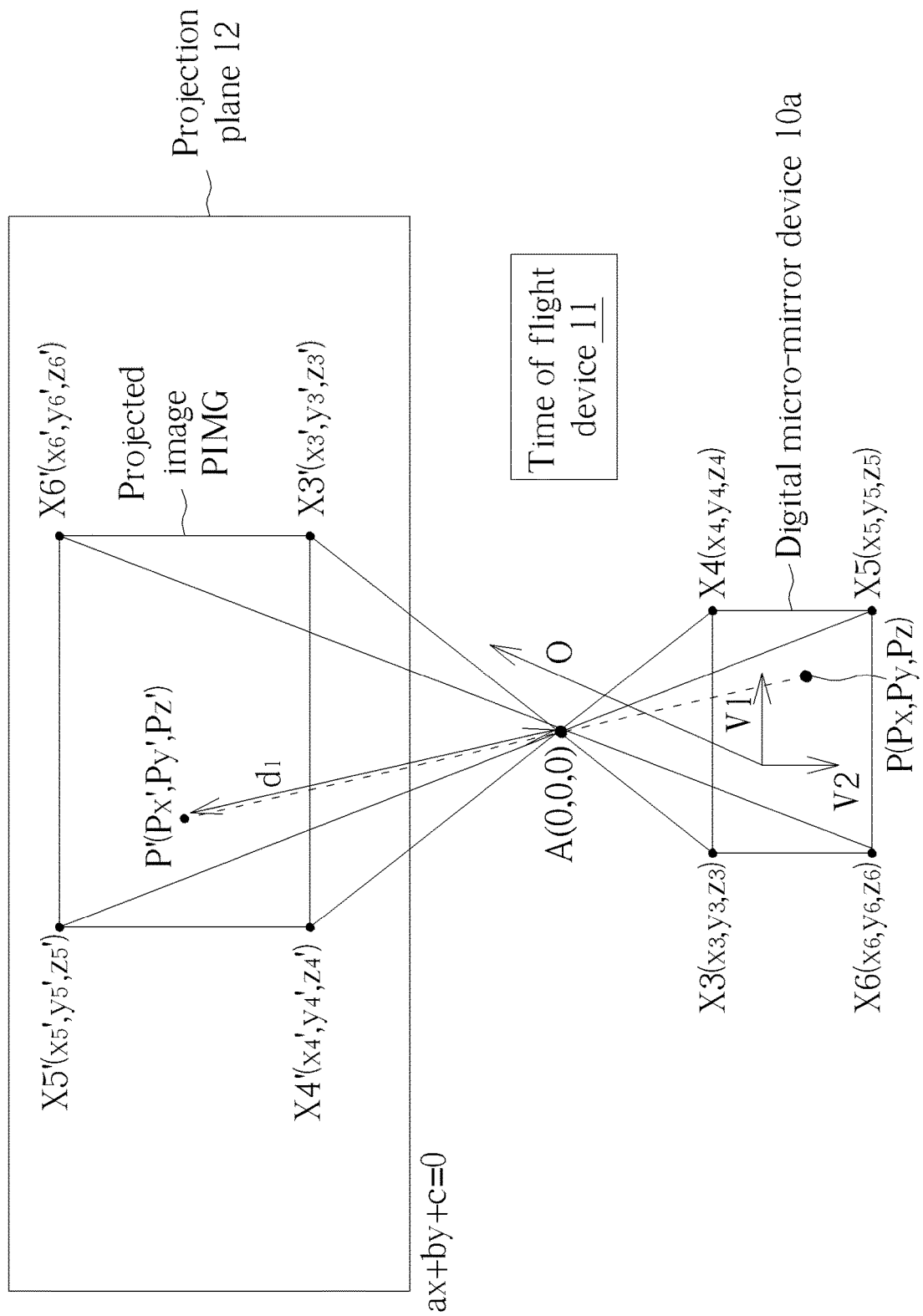
FIG. 3 is an illustration of acquiring projection image coordinates and projection target coordinates between a digital micro-mirror device and a projection plane by using a projection equation of the projector focusing system in FIG. 1.

FIG. 3 is an illustration of acquiring projection image coordinates and projection target coordinates between the DMD 10$a$ and the projection plane 12 by using the projection equation of the projector focusing system 100. In the DMD 10$a$ in the projector 10, the image positioning coordinates may be coordinates of the four vertices of the DMD 10$a$. As shown in FIG. 3, image positioning coordinates of a vertex X3 can be denoted as X3($x_3,y_3,z_3$). Image positioning coordinates of a vertex X4 can be denoted as X4 ($x_4,y_4,z_4$). Image positioning coordinates of a vertex X5 can be denoted as X5($x_5,y_5,z_5$). Image positioning coordinates of a vertex X6 can be denoted as X6($x_6,y_6,z_6$). The processor 10$d$ can convert the plurality of image positioning coordinates to a plurality of projected image positioning coordinates of the projection plane 12 by the plane equation. For example, the processor 10$d$ can convert the image positioning coordinates X3 ($x_3,y_3,z_3$) of the vertex X3 to the projected image positioning coordinates X3'($x_3',y_3',z_3'$) of a projected vertex X3' on the projection plane 12 according to the following equation:

$$\begin{cases} \dfrac{x}{x_3} = \dfrac{y}{y_3} = \dfrac{z}{z_3} \\ ax+by+c=0 \end{cases} \quad (9)$$

The processor 10$d$ can convert the image positioning coordinates X4($x_4,y_4,z_4$) of the vertex X4 to the projected image positioning coordinates X4'($x_4',y_4',z_4'$) of a projected vertex X4' on the projection plane 12 according to the following equation:

$$\begin{cases} \dfrac{x}{x_4} = \dfrac{y}{y_4} = \dfrac{z}{z_4} \\ ax+by+c=0 \end{cases} \quad (10)$$

The processor 10$d$ can convert the image positioning coordinates X5($x_5,y_5,z_5$) of the vertex X5 to the projected image positioning coordinates X5'($x_5',y_5',z_5'$) of a projected vertex X5' on the projection plane 12 according to the following equation:

$$\begin{cases} \dfrac{x}{x_5} = \dfrac{y}{y_5} = \dfrac{z}{z_5} \\ ax+by+c=0 \end{cases} \quad (11)$$

The processor 10$d$ can convert the image positioning coordinates X6($x_6,y_6,z_6$) of the vertex X6 to the projected image positioning coordinates X6'($x_6',y_6',z_6'$) of a projected vertex X6' on the projection plane 12 according to the following equation:

$$\begin{cases} \dfrac{x}{x_6} = \dfrac{y}{y_6} = \dfrac{z}{z_6} \\ ax+by+c=0 \end{cases} \quad (12)$$

A range enclosed by the projection vertices X4' to X6' on the projection plane 12 corresponds to the projected image PIMG on the projection plane 12 projected by the projector 10. As previously mentioned, the image positioning coordinates of the four vertices X3 to X6 of the DMD 10a can be determined. Therefore, the processor 10d can acquire at least two direction vectors of the DMD 10a according to the image positioning coordinates. For example, a first direction vector V1 of the DMD 10a can be expressed as:

$$V1=(x_4-x_3, y_4-y_3, z_4-z_3) \quad (13)$$

A second direction vector V2 of the DMD 10a can be expressed as:

$$V2=(x_6-x_3, y_6-y_3, z_6-z_3) \quad (14)$$

Then, the processor 10d can acquire an optical axis vector O of the DMD 10a by using the vector cross product operation according to the at least two direction vectors. Therefore, the optical axis vector of the DMD 10a is a normal vector perpendicular to a DMD plane.

As previously mentioned, the projector focusing system 100 can clearly display images at the designated or target coordinates. Further, the user can specify the designated or target coordinates through the DMD 10a by using the processor 10d. For example, the target coordinates on the DMD 10a can be expressed as $P(P_x, P_y, P_z)$. The target coordinates $P(P_x, P_y, P_z)$ can be determined based on the target coordinates $P(P_x, P_y, P_z)$ according to coordinates of an optical lens center A (i.e., for example, A(0,0,0)) and the plane equation ax+by+c=0 previously derived. The processor 10d can derive projection target coordinates P' ($P_x'$, $P_y'$, $P_z'$) on the projection plane 12 according to the target coordinates $P(P_x, P_y, P_z)$. Specifically, the projection target coordinates P' ($P_x'$, $P_y'$, $P_z'$) satisfy the following equation.

$$\begin{cases} \dfrac{x}{P_x} = \dfrac{y}{P_x} = \dfrac{z}{P_z} \\ ax+by+c=0 \end{cases} \quad (15)$$

Here, since the target coordinates $P(P_x, P_y, P_z)$, the coordinates of an optical lens center A, and the projection target coordinates P' ($P_x'$, $P_y'$, $P_z'$) can be determined, a corresponding customized focus position emitting vector $d_1$ can be derived as:

$$d_1=(P_x', P_y', P_z') \quad (16)$$

Further, the ideal focal distance (length) can be defined as a length of projecting the customized focus position emitting vector $d_1$ to the optical axis vector O. The ideal focal distance can be derived by using an inner product operation, as illustrated below.

Figure 4:
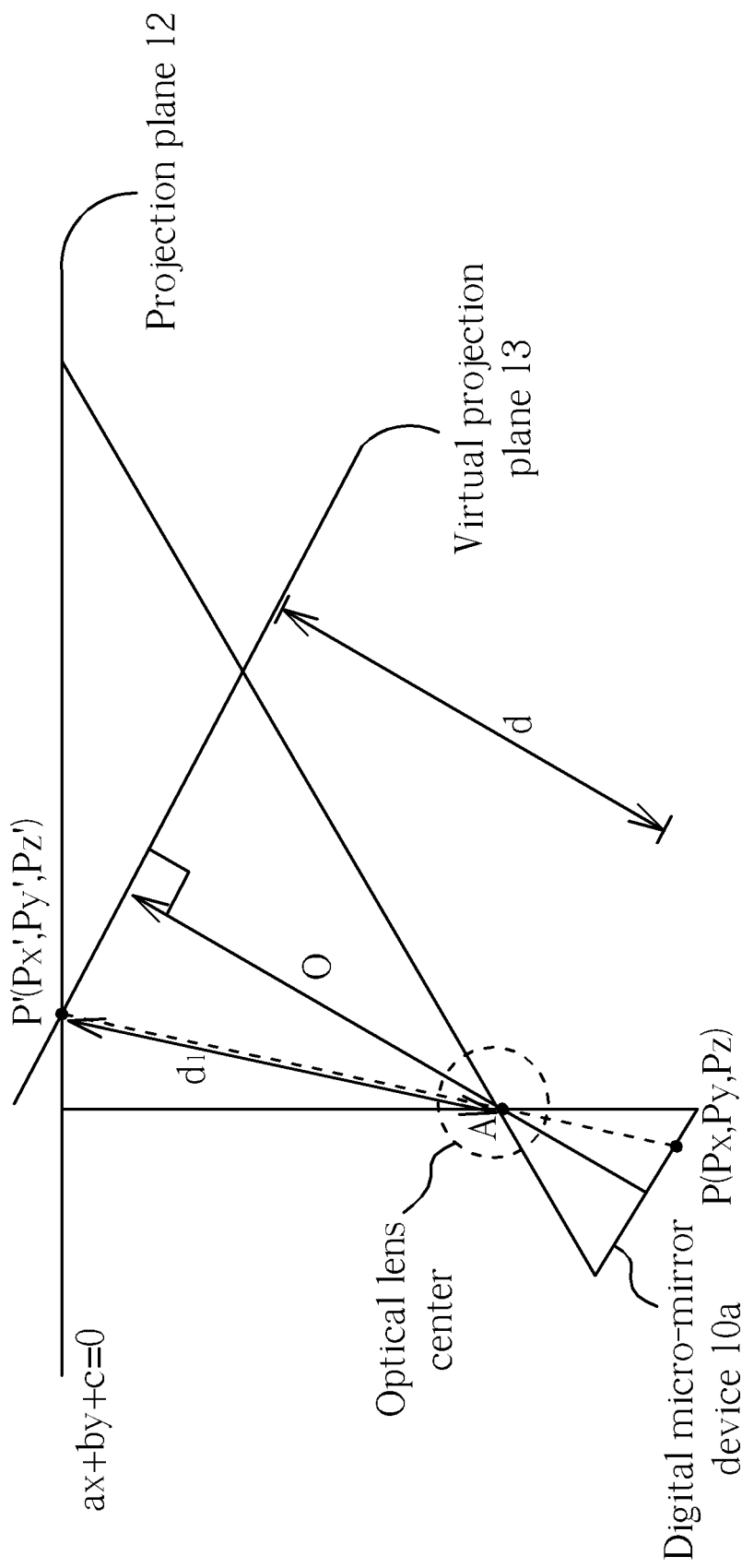
FIG. 4 is an illustration of acquiring an ideal focal distance for clearly displaying images on the projection plane at the projection target coordinates according to a customized focus position emitting vector and an optical axis vector of the projector focusing system in FIG. 1.

FIG. 4 is an illustration of acquiring the ideal focal distance d for clearly displaying images on the projection plane 12 at the projection target coordinates P' ($P_x'$, $P_y'$, $P_z'$) according to the customized focus position emitting vector $d_1$ and the optical axis vector O of the projector focusing system 100. As previously mentioned, the ideal focal distance d can be defined as the length of projecting the customized focus position emitting vector $d_1$ to the optical axis vector O. Therefore, the ideal focal distance d can be derived by using the trigonometric function, as follows.

$$d=|d_1|\cos(\Phi) \quad (17)$$

Here, Φ is an included angle (i.e., hereafter, say "a second angle Φ") formed between the customized focus position emitting vector $d_1$ and the optical axis vector O. $|d_1|$ is a length of the customized focus position emitting vector $d_1$. The length $|d_1|$ can be derived according to a distance between the projection target coordinates P' ($P_x'$, $P_y'$, $P_z'$) and the target coordinates $P(P_x, P_y, P_z)$. Further, cos (Φ) can be derived according to the following equation.

$$\cos(\Phi) = \frac{d_1 \cdot O}{|d_1||O|} \quad (18)$$

Here, $d_1$.O is an inner product of the customized focus position emitting vector $d_1$ and the optical axis vector O. |O| is a length of the optical axis vector O. The length |O| can be derived according to a vertical distance from a center point A of the lens to the projection plane 12. In other words, according to equations (17) and (18), the processor 10d can acquire the second angle θ formed between the customized focus position emitting vector $d_1$ and the optical axis vector O. Then, the processor 10d can acquire the ideal focal distance d according to the second angle θ and the customized focus position emitting vector $d_1$. Further, as shown in FIG. 4, the projector 10 can generate a virtual projection plane 13 according to the optical axis vector O and the ideal focal distance d. Further, an intersection line between the virtual projection plane 13 and the projection plane 12 passes through the projection target coordinates P'($P_x'$,$P_y'$,$P_z'$). Therefore, after the projector 10 is set according to the ideal focal distance d, the projector 10 can generate the projected image PIMG according to the ideal focal distance d. The projected image PIMG can be clearly displayed on the projection plane 12 within a range at the projection target coordinates P'($P_x'$,$P_y'$,$P_z'$).

In the projector focusing system 100, any reasonable technology modification falls into the scope of the present invention. For example, a gap is present between the ToF device 11 and the projector 10. A reasonable length of the gap may be a few centimeters or tens of centimeters. However, the position of the ToF device 11 is not limited to FIG. 1. Generally, when the coordinates of the light emitting point T of the ToF device 11 in FIG. 2 are T(0,0,0), the coordinates of the optical lens center A can be set to $A(a_1,a_2,a_3)$. Further, a distance between the light emitting point T of the ToF device 11 and the optical lens center A can be express as $\sqrt{a_1^2+a_2^2+a_3^2}$.

Derivations of the ideal focal distance d are previously illustrated. Thus, they are omitted here.

Figure 5:
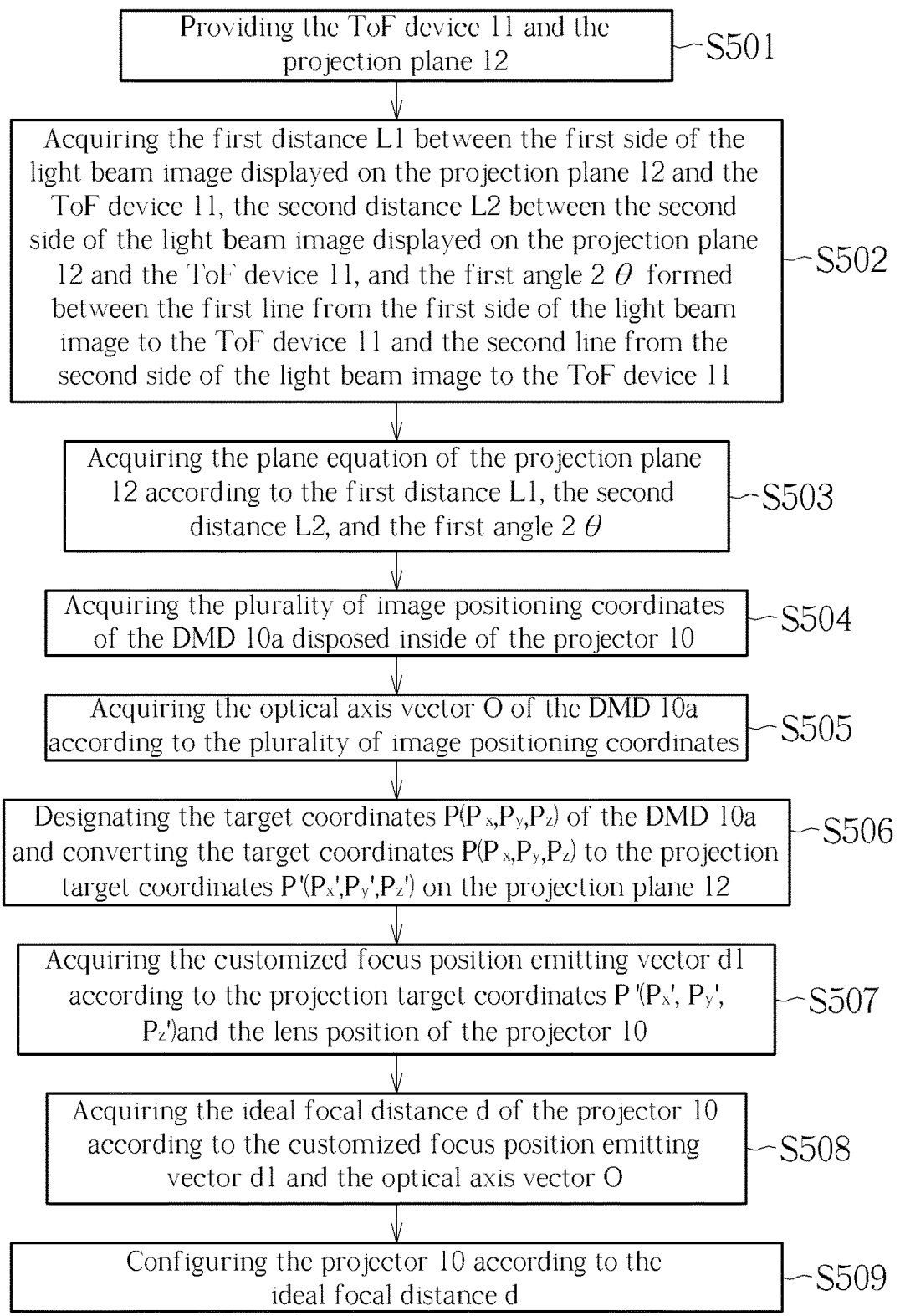
FIG. 5 is a flowchart of performing a projector focusing method by the projector focusing system in FIG. 1.

FIG. 5 is a flowchart of performing a projector focusing method by the projector focusing system 100. The projector focusing method can include step S501 to step S509. Any reasonable technology modification falls into the scope of the present invention. Step S501 to step S509 are illustrated below.

step S501: providing the ToF device 11 and the projection plane 12;

step S502: acquiring the first distance L1 between the first side of the light beam image displayed on the projection plane 12 and the ToF device 11, acquiring the second distance L2 between the second side of the light beam image displayed on the projection plane 12 and the ToF device 11, and acquiring the first angle 2Θ formed between the first line from the first side of the light beam image to the ToF device 11 and the second line from the second side of the light beam image to the ToF device 11 after the ToF device 11 emits a light beam onto the projection plane 12;

step S503: acquiring the plane equation of the projection plane 12 according to the first distance L1, the second distance L2, and the first angle 2Θ;

step S504: acquiring the plurality of image positioning coordinates (X3 ($x_3,y_3,z_3$) to X6 ($x_6,y_6,z_6$)) of the DMD 10a disposed inside of the projector 10;

step S505: acquiring the optical axis vector O of the DMD 10a according to the plurality of image positioning coordinates (X3 ($x_3,y_3,z_3$) to X6 ($x_6,y_6,z_6$));

step S506: designating the target coordinates P($P_x,P_y,P_z$) of the DMD 10a and converting the target coordinates P($P_x,P_y,P_z$) to the projection target coordinates P' ($P_x'$, $P_y'$, $P_z'$) on the projection plane 12 according to the plane equation;

step S507: acquiring the customized focus position emitting vector $d_1$ according to the projection target coordinates P'($P_x'$, $P_y'$, $P_z'$) and the lens position of the projector 10;

step S508: acquiring the ideal focal distance d of the projector 10 according to the customized focus position emitting vector $d_1$ and the optical axis vector O;

step S509: configuring the projector 10 according to the ideal focal distance d so that the projected image PIMG is clearly displayed on the projection plane 12 at the projection target coordinates P' ($P_x'$, $P_y'$, $P_z'$).

Details of step S501 to step S509 are previously illustrated. Thus, they are omitted here. In the projector focusing system 100, the plane equation of the projection plane 12 can be derived according to detection results of the ToF device 11. When a user designates the projection target coordinates or certain region of the projected image, the projector focusing system 100 can use the plane equation for generating the ideal focal distance d of the projector 10. Therefore, the projected image can be clearly displayed within the range at the projection target coordinates.

To sum up, the present invention discloses a projector focusing system. The projector focusing system introduces the ToF device for detecting distance between the projector and the screen (projection plane). Therefore, the plane equation of the projection plane can be derived. When a user wants to clearly display the projected image at the designated coordinates or certain region, the projector focusing system can use the plane equation for generating the ideal focal distance of the projector. Then, the projector can generate the virtual projection plane according to the optical axis vector and the ideal focal distance. Since the intersection line between the virtual projection plane and the projection plane passes through the projection target coordinates, the projected image can be clearly displayed within the range at the projection target coordinates.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A projector focusing method comprising:
   providing a time of flight (ToF) device and a projection plane;
   acquiring a first distance between a first side of a light beam image displayed on a projection plane and the ToF device, acquiring a second distance between a second side of the light beam image displayed on the projection plane and the ToF device, and acquiring a first angle formed between a first line from the first side of the light beam image to the ToF device and a second line from the second side of the light beam image to the ToF device after the ToF device emits a light beam onto the projection plane;
   acquiring a plane equation of the projection plane according to the first distance, the second distance, and the first angle;
   acquiring a plurality of image positioning coordinates of a digital micro-mirror device (DMD) disposed inside of a projector;
   acquiring an optical axis vector of the DMD according to the plurality of image positioning coordinates;
   designating target coordinates of the DMD and converting the target coordinates to the projection target coordinates on the projection plane according to the plane equation;
   acquiring a customized focus position emitting vector according to the projection target coordinates and a lens position of the projector;
   acquiring an ideal focal distance of the projector according to the customized focus position emitting vector and the optical axis vector; and
   configuring the projector according to the ideal focal distance so that a projected image is clearly displayed on the projection plane at the projection target coordinates.

2. The projector focusing method of claim 1, wherein acquiring the plane equation of the projection plane according to the first distance, the second distance, and the first angle comprises:
   acquiring a plurality of plane coordinates of the projection plane according to the first distance, the second distance, and the first angle;
   acquiring at least two direction vectors according to the plurality of plane coordinates; and
   acquiring the plane equation of the projection plane according to the at least two direction vectors.

3. The projector focusing method of claim 1, further comprising:
   acquiring offset angles of the projector on a pitch axis, a yaw axis, and a roll axis by a gravity sensor;
   generating a rotation vector matrix according to the offset angles on the pitch axis, the yaw axis, and the roll axis; and
   calibrating the plane equation according to the rotation vector matrix.

4. The projector focusing method of claim 3, wherein if the projector has no offset angle on the pitch axis, the yaw axis, and the roll axis, the rotation vector matrix is an identity matrix.

5. The projector focusing method of claim 1, further comprising:
   converting the plurality of image positioning coordinates to a plurality of projected image positioning coordinates of the projection plane by the plane equation.

6. The projector focusing method of claim 1, wherein acquiring the optical axis vector of the DMD according to the plurality of image positioning coordinates comprises:
   acquiring at least two direction vectors of the DMD according to the image positioning coordinates; and
   acquiring the optical axis vector of the DMD by using a vector cross product operation according to the at least two direction vectors;
   wherein the optical axis vector of the DMD is a normal vector perpendicular to a DMD plane.

7. The projector focusing method of claim 1, wherein the projector generates a virtual projection plane according to the optical axis vector and the ideal focal distance, and an intersection line between the virtual projection plane and the projection plane passes through the projection target coordinates.

8. The projector focusing method of claim 1, wherein configuring the projector according to the ideal focal distance comprises:
configuring the projector to the ideal focal distance; and
generating the projected image by the projector according to the ideal focal distance;
wherein the projected image is clearly displayed on the projection plane within a range at the projection target coordinates.

9. The projector focusing method of claim 1, wherein a gap is present between the ToF device and the projector.

10. The projector focusing method of claim 1, wherein acquiring the ideal focal distance of the projector according to the customized focus position emitting vector and the optical axis vector comprises:
acquiring a second angle between the customized focus position emitting vector and the optical axis vector; and
acquiring the ideal focal distance of the projector according to the second angle and the customized focus position emitting vector.

11. A projector focusing system comprising:
a projector comprising:
a digital micro-mirror device (DMD) configured to generate an image;
a lens facing the DMD and configured to project the image;
a gravity sensor configured to detect an offset angle of the projector; and
a processor coupled to the DMD, the lens, and the gravity sensor;
a time of flight (ToF) device; and
a projection plane configured to generate a projected image;
wherein after the ToF device emits a light beam onto the projection plane, the processor acquires a first distance between a first side of a light beam image displayed on the projection plane and the ToF device, acquires a second distance between a second side of the light beam image displayed on the projection plane and the ToF device, acquires a first angle formed between a first line from the first side of the light beam image to the ToF device and a second line from the second side of the light beam image to the ToF device, the processor acquires a plane equation of the projection plane according to the first distance, the second distance, and the first angle, the processor acquires a plurality of image positioning coordinates of the DMD, the processor acquires an optical axis vector of the DMD according to the plurality of image positioning coordinates, the processor designates target coordinates of the DMD and converts the target coordinates to the projection target coordinates on the projection plane according to the plane equation, the processor acquires a customized focus position emitting vector according to the projection target coordinates and a lens position of the projector, the processor acquires an ideal focal distance of the projector according to the customized focus position emitting vector and the optical axis vector, and the processor configures the projector according to the ideal focal distance so that the projected image is clearly displayed on the projection plane at the projection target coordinates.

12. The projector focusing system of claim 11, wherein the processor acquires a plurality of plane coordinates of the projection plane according to the first distance, the second distance, and the first angle, the processor acquires at least two direction vectors according to the plurality of plane coordinates, and the processor acquires the plane equation of the projection plane according to the at least two direction vectors.

13. The projector focusing system of claim 11, wherein the gravity sensor is configured to acquire the offset angles of the projector on a pitch axis, a yaw axis, and a roll axis, the processor generates a rotation vector matrix according to the offset angles on the pitch axis, the yaw axis, and the roll axis, and the processor calibrates the plane equation according to the rotation vector matrix.

14. The projector focusing system of claim 13, wherein if the projector has no offset angle on the pitch axis, the yaw axis, and the roll axis, the rotation vector matrix is an identity matrix.

15. The projector focusing system of claim 11, wherein the processor converts the plurality of image positioning coordinates to a plurality of projected image positioning coordinates of the projection plane by the plane equation.

16. The projector focusing system of claim 11, wherein the processor acquires at least two direction vectors of the DMD according to the image positioning coordinates, the processor acquires the optical axis vector of the DMD by using a vector cross product operation according to the at least two direction vectors, and the optical axis vector of the DMD is a normal vector perpendicular to a DMD plane.

17. The projector focusing system of claim 11, wherein the projector generates a virtual projection plane according to the optical axis vector and the ideal focal distance, and an intersection line between the virtual projection plane and the projection plane passes through the projection target coordinates.

18. The projector focusing system of claim 11, wherein after the projector is configured to the ideal focal distance, the projector generates the projected image according to the ideal focal distance, and the projected image is clearly displayed on the projection plane within a range at the projection target coordinates.

19. The projector focusing system of claim 11, wherein a gap is present between the ToF device and the projector.

20. The projector focusing system of claim 11, wherein the processor acquires a second angle between the customized focus position emitting vector and the optical axis vector, and the processor acquires the ideal focal distance of the projector according to the second angle and the customized focus position emitting vector.

* * * * *